UNITED STATES PATENT OFFICE.

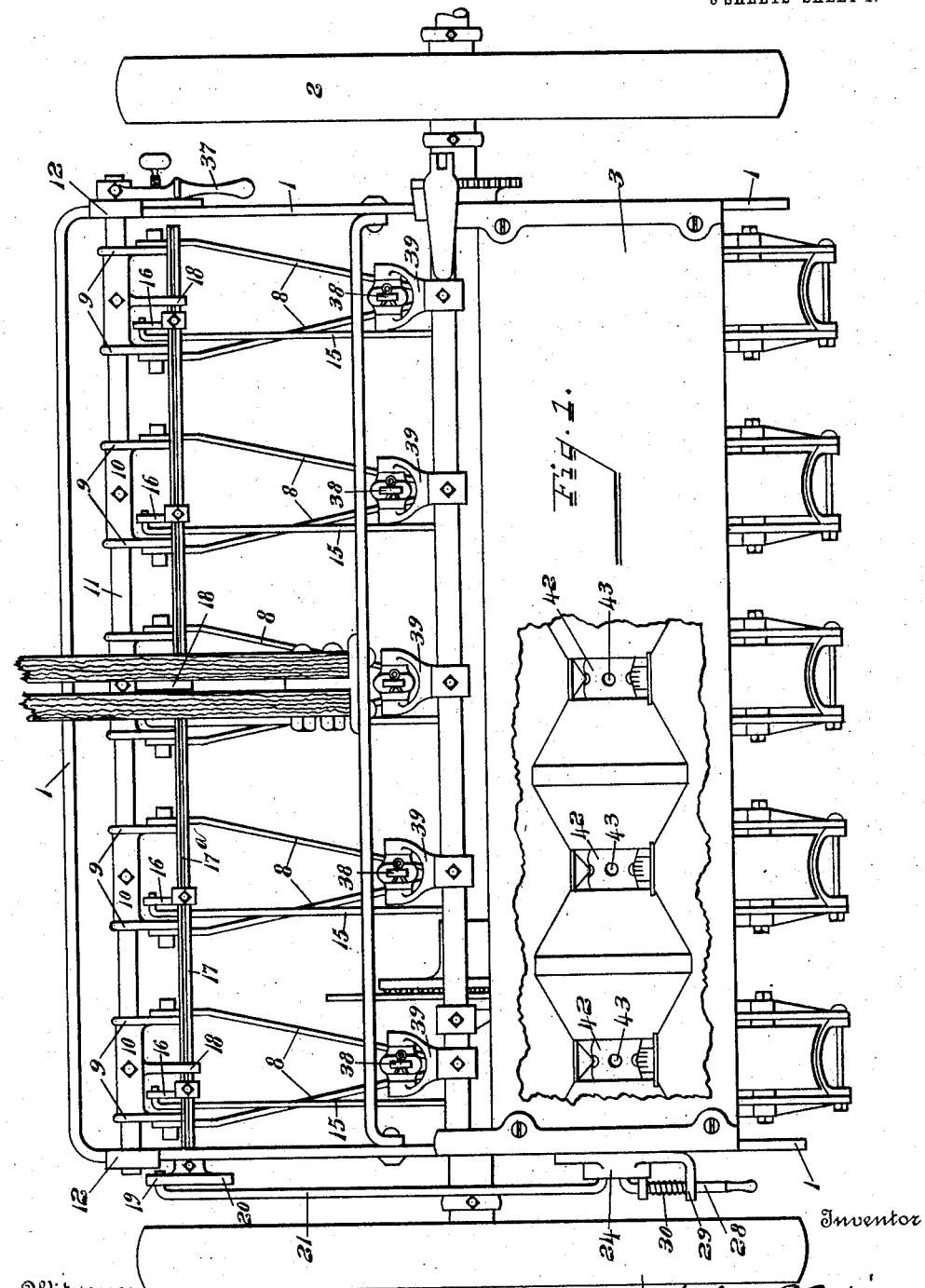

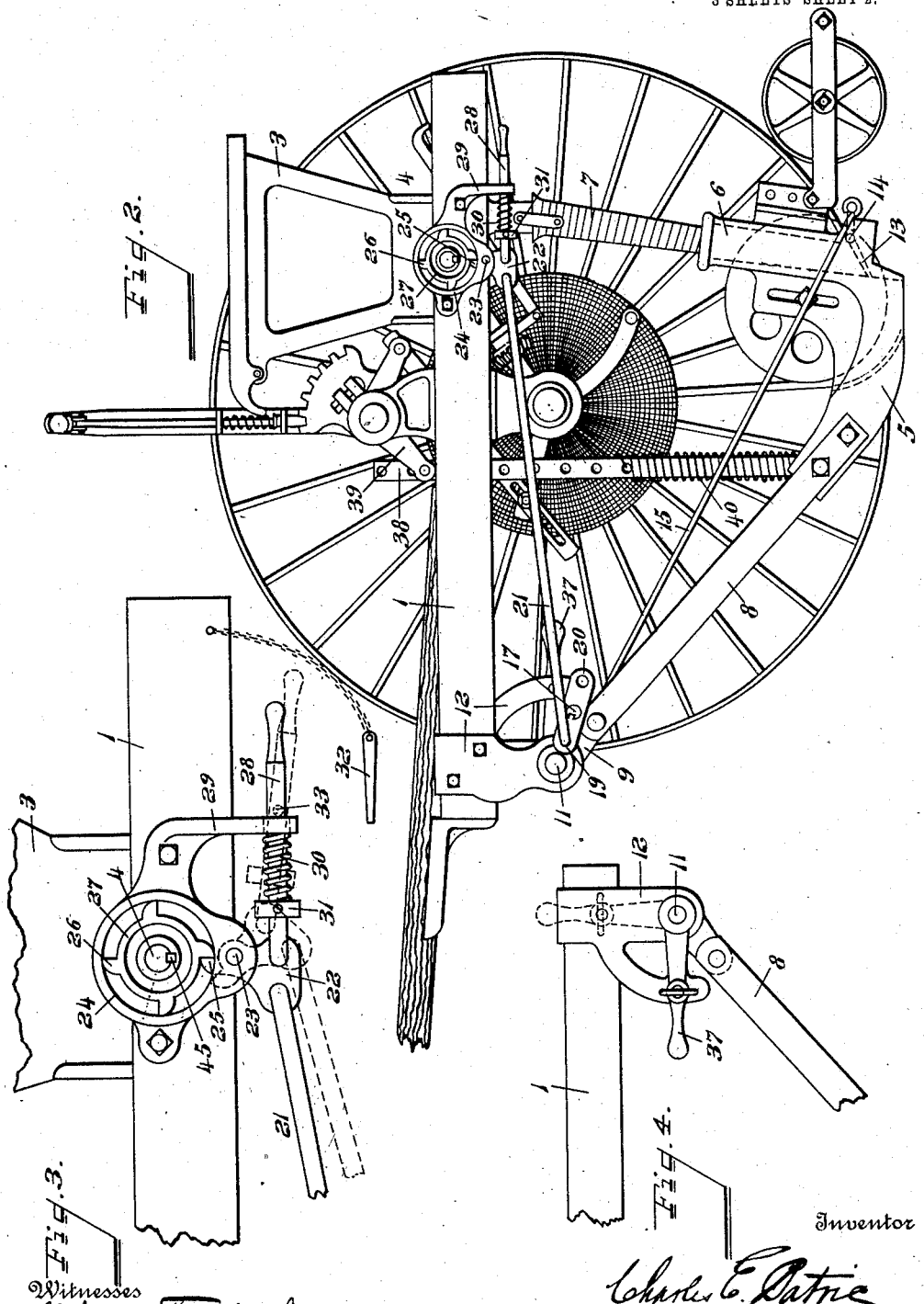

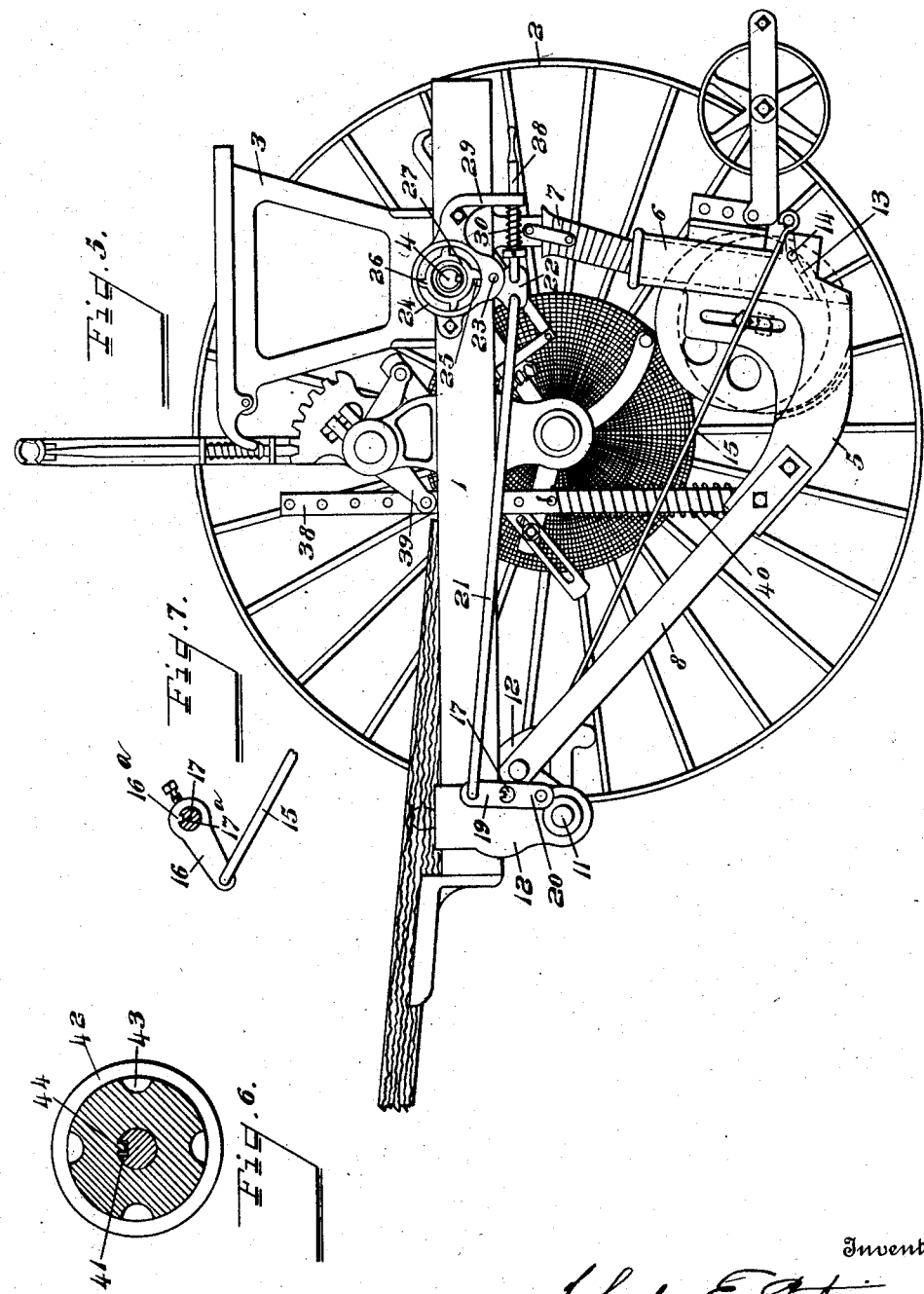

CHARLES E. PATRIC, OF SPRINGFIELD, OHIO.

PLANTING-MACHINE.

1,015,245.  Specification of Letters Patent.  Patented Jan. 16, 1912.

Application filed October 10, 1910. Serial No. 586,267.

*To all whom it may concern:*

Be it known that I, CHARLES E. PATRIC, a citizen of the United States, residing at Springfield, in the county of Clark and State of Ohio, have invented certain new and useful Improvements in Planting-Machines, of which the following is a specification.

My invention relates to improvements in seed planting machines, and it particularly relates to planters adapted to plant the seed in hills as well as sow the same in continuous streams.

The object of the invention is to provide improved mechanism for operating the valves when the machine is planting in hills, which mechanism is so arranged as to compensate for the rise and fall of the furrow openers due to the uneven surface of the ground.

A further object of my invention is to provide means for adjusting the furrow openers and valve operating mechanism with respect to the frame of the machine to adapt the machine for planting on "beds" as will be explained more fully hereinafter.

The invention consists in the construction and combination of parts hereinafter described and set forth in the claims.

In the accompanying drawings: Figure 1 is a plan view of a machine embodying my improvements. Fig. 2 is a side elevation of the same. Fig. 3 is a detail of a part of the valve operating mechanism. Fig. 4 is a detail of the adjusting devices for the furrow openers and valve operating mechanism. Fig. 5 is also a side elevation showing the parts in a different position from that shown in Fig. 2. Fig. 6 is a detail in section of one of the seed distributing wheels. Fig. 7 is a detail of part of the valve operating mechanism.

Like parts are represented by similar characters of reference in the several views.

In the said drawings, 1 represents the main frame of the machine which is preferably constructed U-shaped and of steel. The usual carrying wheels are represented by 2.

3 is a hopper of the usual construction in which are arranged the seed distributing devices, the distributing devices which are preferably employed being those shown in my Patent No. 899,557, dated September 29th, 1908, which are operated by the feed shaft 4, this feed shaft being continuously revolved when the machine is in operation from the axle of the carrying wheels, the usual change-of-speed devices being employed to vary the speed of the shaft in the usual way.

5—5 represents a series of furrow openers which may be of any desired construction, those shown in the drawings being of the well known shoe type, having the usual conduits 6 into which the seed from the hopper 3 is conveyed through the flexible tubes 7. The drag-bars 8 of these furrow openers are pivotally connected at their forward ends to crank arms 9, integrally formed with sleeves 10, which sleeves are secured to the transverse shaft 11. This shaft 11 is preferably square in cross section but has rounded ends which are journaled in the depending brackets 12 secured to the main frame 1.

Located in the lower end of each conduit 6 of the furrow openers is a valve 13 pivoted to the walls of the conduit at 14. The rear end of each of these valves is pivotally connected by a rod 15 to a crank arm 16, secured to the transverse shaft 17 oscillatably supported in arms 18 which project from the sleeves 10 previously described as being mounted upon the shaft or rod 11. As shown in Fig. 1 and also in Fig. 7 the shaft 17 is provided with a continuous spline or key-way 17$^a$ and the sleeves or hubs of the crank arm 16 are provided with keys 16$^a$, which insures the crank arm 16 projecting at the same angle. As shown in Fig. 1 these crank arms are retained from lateral movement on said shafts by set screws. Splined to one end of this shaft 17 are crank arms 19 and 20 perforated to receive the end of the rod 21. The other end of this rod 21 is pivotally connected with one arm 22 of a lever which lever is pivoted at 23 in a recess in a casing 24, which is bolted to the main frame 1. The other arm 25 of this lever projects into the interior of the casing into the path of movement of projections 26 on a wheel 27 connected with the feed shaft 4. Also pivotally connected with the arm 22 of said lever is a rearwardly extending rod 28 slidably supported in a bracket 29. A spring 30 coiled about said rod 28 between said bracket 29 and a collar 31 tends to normally hold the lever arm 25 in the path of movement of the projections 26. As the feed shaft revolves it will be seen that the projections 26 will operate the lever 25 to open the valves 13 through the connections described and so soon as the projections 26 clear the lever arm 25 the spring 30 will immediately close said valves. This valve operating mechanism is employed when it is desired to plant such seeds as corn and beans in hills. When it is desired to drill the seed, all the valves are held open by a pin 32 which may be inserted through an opening 33 in the rod 28 behind the bracket 29.

The feed shaft 4 has throughout its length a spline or key-way 41 by which the various seed distributing wheels are rotatably connected therewith. One of these seed wheels 42 is shown in Fig. 6 and is provided with a series of seed pockets 43. The key 44 on the wheel is located in direct line with one of the pockets. The trip wheel 27 has a key 45 which fits the spline in the feed shaft and this key 45 is located in direct line with one of the projections 26. The number of projections 26 corresponds with the number of pockets in the distributing wheels. By this construction it will be seen that the opening of the valves will be properly timed with the feeding of the seed by the distributing wheels and also facilitate the assembling of the parts. When the feed wheels are changed for wheels with a greater or less number of pockets, the trip wheel will also be changed to correspond.

By having the connecting rods 21 and 15 extended forward and pivotally connected to the rock shaft 17 at a point in close proximity to the pivotal connections of the drag-bars 8, it will be seen that the rise and fall of the furrow openers incident to uneven travel will not affect the proper operation of the valve operating mechanism, since the rods 15 in rising and falling with the furrow openers will swing about substantially the same pivotal point.

In certain sections of the country, for planting certain kinds of seed, it is common to construct beds divided by alleys. For planting seed on these beds I have so constructed the machine that the carrying wheel may be adjusted to run in the alleys and the furrow opening devices so adjusted with respect to the carrying wheels, that they will properly plant the seed. To accomplish this I have provided for raising the entire series of furrow openers with respect to the carrying wheels and other parts of the machine.

Secured to one end of the shaft 11 is a crank 37 by which the shaft may be rocked so as to swing the arms 9, to which the forward ends of the drag bars are pivoted, upwardly so as to raise the pivotal points of said drag bars. This construction maintains the toes of the shoes of the furrows at the same angle with respect to the ground as when in lowered position on level ground. At the same time, owing to the fact that the shaft 17 is connected to the shaft 11, said shaft 17 is also swung on the arc of a circle thus raising the pivotal points of the connections therewith of the valve operating rods 15 so as to maintain their pivotal points in the same relation with the pivotal points of the drag bars. When the machine is thus adjusted the connecting rod 21 is disconnected from the forward end of the crank arm 19 and connected to the rear end of the arm at 20. Also, the connection between the pressure rods 38 and the cranks 39 of the raising and lowering mechanism is also changed so that the springs 40 may exert the same pressure upon the furrow openers in this new position of adjustment as when in the normal position.

Having thus described my invention, I claim:

1. In a seed planting machine, a main frame, a seed hopper having a series of feeding devices therein, a feed shaft operatively connected with said feeding devices, a series of furrow opening devices pivotally connected at their forward ends to said frame, valves in said furrow opening devices, a rock shaft supported by said frame in proximity to the pivotal points of said furrow openers, a connection from said rock shaft to each of said valves, a tripping mechanism operated directly by said feed shaft, and a connection from said tripping mechanism to said rock shaft, substantially as specified.

2. In a seed planting machine, a series of furrow openers, said openers having drag-bars pivotally connected at their forward ends, and means for raising and lowering said pivotal connections, substantially as and for the purpose specified.

3. In a seed planting machine, a series of furrow openers, having drag-bars pivoted at their forward ends, valves in said furrow openers, valve operating mechanism, said valve operating mechanism having pivotal connections to compensate for the rise and fall of the furrow openers, and means for correspondingly raising and lowering the pivotal connections of said drag-bar and valve operating mechanism, substantially as specified.

4. In a seed planting machine, a series of furrow openers having drag-bars, a transverse rock shaft having crank arms, the forward ends of said drag-bars being pivotally connected to said crank arms, seed dropping valves in said furrow openers, operating mechanism for said valves, said operating mechanism comprising a rod revolubly supported by said rock shaft and parallel therewith, and means for rocking said shaft, substantially as specified.

5. In a seed planting machine, a series of furrow openers having drag-bars pivoted at their forward ends, seed dropping valves in said furrow openers, a transverse shaft having crank arms, rods connecting said valves with said crank arms, a tripping mechanism, and a connection between said tripping mechanism and said shaft to rock said shaft, substantially as specified.

6. In a planting machine, a main hopper, a series of distributer wheels therein, each of said distributer wheels having a series of pockets, a revoluble feed shaft having a key way, a key on each of said distributer wheels located adjacent one of the pockets thereof, and a trip wheel having a series of tripping projections corresponding to the number of pockets in each of said distributer wheels, said tripping wheel also having a key locater adjacent one of the trips thereof for connection with said shaft, substantially as and for the purpose specified.

7. In a seed planting machine, a series of furrow openers, valves located in said furrow openers, a rock shaft having a series of crank arms one for each furrow opener, connections between said crank arms and said valves, a tripping mechanism also connected to said rock shaft, said rock shaft having a key-way and said crank arms each having a key to fit said key way, substantially as and for the purpose specified.

8. In a planting machine, a series of furrow openers, valves in said furrow openers, a rock shaft, connections between said rock shaft and valve, a rotatable shaft, a trip wheel upon said shaft, a trip lever adapted to be operated by said wheel, and a connection between said lever and said rock shaft, substantially as specified.

9. In a planting machine, a series of furrow openers, valves in said furrow openers, a rock shaft, connections between said rock shaft and valves, a rotatable shaft, a trip wheel upon said shaft, a trip lever adapted to be operated by said wheel, a connection between the lever and said rock shaft, and means for holding said trip lever out of operative position, substantially as specified.

In testimony whereof, I have hereunto set my hand this 23rd day of September, 1910.

CHARLES E. PATRIC.

Witnesses:
 CHAS. I. WELCH,
 ELSA K. SMITH.

---

Copies of this patent may be obtained for five cents each, by addressing the "Commissioner of Patents, Washington, D. C."